(12) United States Patent
Benny et al.

(10) Patent No.: US 7,487,079 B2
(45) Date of Patent: *Feb. 3, 2009

(54) ENTERPRISE SERVICE DELIVERY TECHNICAL ARCHITECTURE

(75) Inventors: Mark Andrew Benny, Raleigh, NC (US); Philippe Compain, Ouvrouer les Champs (FR); Alan Paul Pickersgill, Gosport (GB); Stephen William Nekolaichuk, Georgetown, TX (US); Robert J. Simmons, Poughkeepsie, NY (US); Chris Edward Terry, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1578 days.

This patent is subject to a terminal disclaimer.

(21) Appl. No.: 09/875,865

(22) Filed: Jun. 7, 2001

(65) Prior Publication Data
US 2002/0188430 A1  Dec. 12, 2002

(51) Int. Cl.
*G06F 9/45* (2006.01)
(52) U.S. Cl. ............. 703/22; 707/104.1; 709/230; 717/104
(58) Field of Classification Search ......... 717/103–104; 703/22, 7, 2; 709/230; 707/102, 104.1; 705/1, 705/7, 9

See application file for complete search history.

(56) References Cited

U.S. PATENT DOCUMENTS

| 6,269,473 | B1 * | 7/2001 | Freed et al. ............ 717/104 |
| 6,401,081 | B1 * | 6/2002 | Montgomery et al. ...... 705/63 |
| 6,640,231 | B1 * | 10/2003 | Andersen et al. ........ 707/102 |
| 6,662,355 | B1 * | 12/2003 | Caswell et al. .......... 717/103 |
| 6,670,973 | B1 * | 12/2003 | Hill et al. .............. 715/853 |

OTHER PUBLICATIONS

Weston, R.H. Reconfigurable, Component-based Systems and the Role of Enterprise Engineering Concepts, Elsevier, Computers in Industry 40, 1999, pp. 321-343.*

* cited by examiner

*Primary Examiner*—Russell Frejd
(74) *Attorney, Agent, or Firm*—David A. Mims, Jr.; Winstead, P.C.

(57) ABSTRACT

An Enterprise Service Delivery Technical Architecture includes a Technical Model, and a Technical Delivery Framework, and is designed to facilitate the development of complete enterprise service management solutions. The use of the Enterprise Service Delivery Technical Architecture as the framework for an enterprise systems management technical solution results in solution designs created to be independent of the technology platform being managed with a view that meets the overall business requirements that span the technology platforms within a business environment. An information technology infrastructure already in place for a customer is analyzed and broken down to its very lowest level building blocks. Then the building blocks within the model of the technical architecture are mapped with the building blocks of the customer's information technology infrastructure to determine which of the building blocks of the model are to be used for the customer's information technology operation.

3 Claims, 15 Drawing Sheets

ABB0: ME Management Enablement

- ABB1: ME-1 Analyze
  - ABB2: ME-1-1 Business Systems Modeling
  - ABB2: ME-1-2 Forecasting
  - ABB2: ME-1-4 Verifying
    - ABB3: ME-1-4-1 Check Status
    - ABB3 : ME-1-4-2 Check Progress
  - ABB2: ME-1-5 Correlating
  - etc.

- ABB1: ME-2 Control
  - ABB2: ME-2-1 Add
  - ABB2: ME-2-2 Remove
  - etc.

- etc.

| From ABB | To ABB | Function | ABB1 N |
|---|---|---|---|
| UI-2 | ME-1 | To provide authentication | |
| UI-2 | ME-1 | To provide subscription | |
| UI-2 | ME-1 | To provide scheduling | |
| UI-2 | ME-1 | To perform an analysis request | |
| UI-3 | ME-3 | To provide the information needed to be rendered | |
| ME-1 | ME-2 | Perform action on an IT resource | Analyze |
| ME-1 | ME-3 | Communicate to a resource (people or IT resources) | |
| ME-1 | ME-4 | Synchronize activities | |
| ME-1 | AS-2 | For the transportation of information | |
| ME-1 | DT-1 | Receive and store data | |
| ME-1 | IN-1 | Perform any integration necessary between mgmt enablement | |
| ME-1 | RS-0 | Receive information from IT resources | |
| ME-1 | UI-2 | Receive request to analyze | |

FIG. 6

| Identifier | Location | Type | O/S | Software | Components |
|---|---|---|---|---|---|
| ME0001 | New York | Mainframe | MVS | CICS | N/A |
| DASD001 | New York | Data Store | N/A | N/A | 2K TB Disk |
| SERV001 | London | LAN Serv | Win NT | SAP | CPU, Disk |
| SERV002 | Portsmouth | LAN Serv | Win NT | SAP | CPU, Disk |
| SERV003 | Chicago | LAN Serv | Win NT | Novell | CPU, Disk |
| SERVxxx | Vancouver | Print Serv | Win NT | N/A | CPU, Disk |
| WS001 | New York | Workstation | Win 95 | MS Office | CPU, Disk |
| WS002 | New York | Workstation | Win 95 | MS Office | CPU, Disk |
| WS003 | New York | Workstation | Linux | Netview | CPU, Disk |
| WSxxx | Vancouver | Workstation | Win 2000 | MS Office | CPU, Disk |
| HUB001 | New York | Hub | N/A | N/A | N/A |
| HUBxxx | Vancouver | Hub | N/A | N/A | N/A |
| ROUT001 | New York | Router | N/A | N/A | N/A |
| ROUTxxx | Vancouver | Router | N/A | N/A | N/A |

FIG. 9

| ABB | Type | O/S | Software | Components |
|---|---|---|---|---|
| RS1-1-1 | Router | N/A | N/A | N/A |
| RS1-1-2 | Hub | N/A | N/A | N/A |
| RS1-1-3 | LAN Serv | Win NT | SAP | CPU, Disk |
| RS1-1-4 | Print Serv | Win NT | N/A | CPU, Disk |
| | | | | |
| RS2-2-20 | Mainframe | MVS | CICS | N/A |
| RS2-2-21 | Data Store | N/A | N/A | 2K TB Disk |
| | | | | |
| RS3-1-9 | Workstation | Win 2000 | MS Office | CPU, Disk |
| RS3-1-10 | Workstation | Win 95 | MS Office | CPU, Disk |
| RS3-1-11 | Workstation | Linux | Netview | CPU, Disk |
| | | | | |
| RSx-x-x | Workstation | Win 3.1 | WP5.1 | CPU, Disk |

FIG. 10

| Identifier | ABB |
|---|---|
| MF001 | RS2-2-20 |
| DASD001 | RS2-2-21 |
| SERV001 | RS1-1-3 |
| SERV002 | RS1-1-3 |
| SERV003 | RS1-1-5 |
| | |
| SERVxxx | RS1-1-4 |
| WS001 | RS1-1-10 |
| WS002 | RS3-1-10 |
| WS003 | RS3-1-11 |
| | |
| WSxxx | RS3-1-9 |
| HUB001 | RS1-1-2 |
| | |
| HUBxxx | RS1-1-2 |
| ROUT001 | RS1-1-1 |
| | |
| ROUTxxx | RS1-1-1 |

FIG. 11

| Identifier | ABB | Physical Relationship |
|---|---|---|
| ME0001 | RS2-2-20 | To HUB001 |
| DASD001 | RS2-2-21 | To ME001 |
| SERV001 | RS1-1-3 | To HUB001 |
| SERV002 | RS1-1-3 | To HUB010 |
| SERV003 | RS1-1-5 | To HUB030 |
| SERVxxx | RS1-1-4 | To HUBxxx |
| WS001 | RS1-1-10 | To HUB009 |
| WS002 | RS3-1-10 | To HUB015 |
| WS003 | RS3-1-11 | To HUB075 |
| WSxxx | RS3-1-9 | To HUBxxx |
| HUB001 | RS1-1-2 | To ROUT001 |
| HUBxxx | RS1-1-2 | To ROUTxxx |
| ROUT001 | RS1-1-1 | To ROUTxxx |
| ROUTxxx | RS1-1-1 | To ROUT001 |

FIG. 12

| Identifier | ABB | Physical Relationship | ABBs for Event Mgmt | ABBs for Problem Mgmt | ABBs Relationships |
|---|---|---|---|---|---|
| ME0001 | RS2-2-20 | To HUB001 | List A | List B | Relate A |
| DASD001 | RS2-2-21 | To ME001 | List C | List D | Relate B |
| SERV001 | RS1-1-3 | To HUB001 | List E | List F | Relate C |
| SERV002 | RS1-1-3 | To HUB010 | List E | List F | Relate C |
| SERV003 | RS1-1-5 | To HUB030 | List G | List H | Relate D |
| SERVxxx | RS1-1-4 | To HUBxxx | List I | List J | Relate E |
| WS001 | RS1-1-10 | To HUB009 | List K | List L | Relate F |
| WS002 | RS3-1-10 | To HUB015 | List K | List L | Relate F |
| WS003 | RS3-1-11 | To HUB075 | List M | List N | Relate G |
| WSxxx | RS3-1-9 | To HUBxxx | List O | List P | Relate H |
| HUB001 | RS1-1-2 | To ROUT001 | List Q | List R | Relate H |
| HUBxxx | RS1-1-2 | To ROUTxxx | List Q | List R | Relate H |
| ROUT001 | RS1-1-1 | To ROUTxxx | List S | List T | Relate I |
| ROUTxxx | RS1-1-1 | To ROUT001 | List S | List T | Relate I |

FIG. 13

- List A
  - Event Mgmt for RS2-2-20
  - Requires:
    - UI2-2-25 => Console S/W
    - AS1-2-3 => Security S/W
    - DT2-2-45 => System Logs
    - IN0-10-11 => Scripts
    - ME1-1-2 => Mgmt Agent
    - ME1-3-3 => Monitor Agent
    - RS25-10-4 => Mgmt Server

- Relate A
  - Descibes how ABBs need to be integrated for Event Mgmt
    - UI2-2-25 <=> RS25-10-4
    - UI2-2-25 <=> AS1-2-3
    - DT2-2-45 => IN0-10-11
    - ME1-1-2 => DT2-2-45
    - ME1-3-3 => DT2-2-45
    - DT2-2-45 => RS25-10-4
    - etc.

| UI = User Interface | AS = Access Services | IN = Integration |
|---|---|---|
| DT = Data | ME = Management Enablement | RS = Global IT Resources |

FIG. 14

| ABB | US2-2-25 | AS1-2-3 | ME1-1-2 | | RS25-10-4 |
|---|---|---|---|---|---|
| RS2-2-20 | Required | Required | Required | | Required |
| RS2-2-21 | Required | | Required | | Required |
| RS1-1-2 | | Required | | | Required |
| RS1-1-3 | | | Required | | |
| RS1-1-5 | Required | | Required | | |
| RS1-1-4 | Required | Required | | | |
| RS1-1-10 | | Required | | | Required |
| RS3-1-10 | | | Required | | |
| RS3-1-11 | Required | | Required | | |

Design Object 1
  RS2-2-20 + RS2-2-21 + RS1-1-2 + RS25-10-4

Design Object 2
  RS1-1-4 + US2-2-25 + AS1-2-3

...Design Object x
  ME1-1-2 working on RS2-2-20 and RS2-2-21

FIG. 15

"Design Object" 1 is
- RS2-2-20 => Mainframe
- RS2-2-21 => Data Store
- RS1-1-2 => Hub
- RS25-10-4 => Management Server We Know How These All Relate
- Physical and ABB Model Relationships We Know Attributes such as O/S, S/W, etc.

Available Tools
Netview Server
Computer Associates Unicenter
... Product XYZ

We Identify Specific Requirements/Criteria
- Management server running on MVS
- Manages Data Stores and Hubs
- etc.

Compare Tools To Requirements

Select Netview Server to Satisfy "Design Object 1" Requirements

FIG. 16

ENTERPRISE SERVICE DELIVERY TECHNICAL ARCHITECTURE

CROSS-REFERENCE TO RELATED APPLICATIONS

The present invention is related to the following U.S. patent applications which are hereby incorporated herein by reference:

Ser. No. 09/875,863 entitled "Method for Delivering a Technical Framework";

Ser. No. 09/876,090 entitled "Enterprise Service Delivery Technical Framework";

Ser. No. 09/876,013 entitled "Enterprise Service Delivery Technical Model," now abandoned.

TECHNICAL FIELD

The present invention relates in general to the management of information technology systems.

BACKGROUND INFORMATION

The traditional approach to managing computer systems has been to design and deploy the management system based primarily on which particular type of hardware platform that the subject systems execute on. For example, systems management solutions may be focused on mainframe computers, mid-range computers, networks, LANs, etc. This is a purely technology based approach to systems management which does not align the management of the system to the business functionality of the system or the business requirements of the user of the system. The result of this is that management staff become increasingly remote from the business that the information technology ("IT") supports, which in turn results in a lack of awareness and understanding of the business challenges facing the end users.

For example, some companies derive a significant percentage of their revenues from strategic outsourcing services provided to other companies, such as banks and other financial institutions, which are largely dependent upon information technology to support their products and services to their customers. After such a bank contracts with the strategic outsourcing services of a service provider, it will then go in and hire most of the staff who had been previously running the information technology shop at the bank, and attempt to consolidate equipment and operations more efficiently. Quite often, such information technology shops have grown up from being very small, relying upon individuals more than process. Additionally, systems, hardware, software, and processes will not be that well documented, quite frankly because the people who have developed the IT for the bank have been there for so long that they keep it all in their heads. The advantage that the outsourcing company can bring to this situation is that it has invested considerable research and development into defining processes around these type of IT disciplines, such as data storage and output management, system administration, event management, paging and escalation, security management, operations automation, change orders, etc. The outsourcing company will enter the situation and often apply such process to more efficiently operate the information technology already existing within the bank's technology systems. Payment is in many different ways, such as on a per workstation basis, per server basis, number of employees needed, etc. The whole operation will then be run for the bank, including problem and change management around that structure, often including 24-hour assistance and a help desk.

The problem with this process in general is that it has to be reinvented each time the outsourcing company goes into a new outsourcing arrangement with a new customer. The reason is that different companies have disparate tools. For example, one company may use Microsoft products, while another company uses Lotus products. One company may use Hitachi mainframes, while another company may use IBM mainframes. Even within one particular information technology system within a company, disparate systems, software, and hardware may be used among the various locations. There is some advantage that the outsourcing company can employ by having the same employees cover the information technology needs of a multiple of companies by sharing their time among those companies. However, the design of the outsourcing operation still is often done on an ad hoc basis, dependent upon the particular systems in place at the new customer.

Therefore, what is needed in the art, is a way for an outsourcing company to leverage from the knowledge gained while performing such outsourcing services from one client to the next.

SUMMARY OF THE INVENTION

The present invention addresses the foregoing need by providing an Enterprise Systems Delivery ("ESD") Technical Architecture ("ESDTA"), which includes a Technical Model, and a Technical Delivery Framework. The ESDTA is designed to work within a high-level framework to facilitate the development of complete Enterprise Systems Management Solutions. Thus, the use of the ESDTA as the framework for an Enterprise Systems Management Technical Solution results in solution designs created to be independent of the technology platform with a view that meets the overall business requirements that span the technology platforms within a business environment.

More specifically, an information technology infrastructure already in place for a customer is analyzed and broken down to its very lowest level building blocks. Then the building blocks within the model of the technical architecture of the present invention are mapped with the building blocks of the customer's information technology infrastructure to determine which of the building blocks of the model are to be used for the customer's information technology operation.

An advantage of the present invention is that a technical model of an Enterprise Systems Management Architecture is consistently reused for each new information technology outsourcing customer in a consistent manner, which enables the company providing the outsourcing services to leverage the model and the resources needed to implement the various design objects used within the model.

Adoption of the present invention establishes a framework for the future helping an information technology outsource services provider take on the right business profitably and guide implementation of IT solutions, a common technical vision for the outsourcer and its customers, a rational use of technology, within which IT requirements can be implemented with the confidence that the architectural components will work together, and a range of options, giving the outsourcer the ability to react quickly to changes in business requirements. For designers of technical architectures, there is a standard framework with reusable components within which to construct a solution. For delivery staff, there is a repeatable solution with standard methods and procedures. For the outsourcer, there is a strategic solution to meet the requirements of the customer and a solution with an optimal cost profile. For customers, there is the benefit of exploiting state-of-the-art technologies in a consistent way that brings added value to their IT services.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates an exemplary level 1 ABB relationship table;

FIG. 9 illustrates an exemplary inventory of hardware of a customer;

FIG. 10 illustrates lowest level ABBs;

FIG. 11 illustrates mapping of lowest level ABBs to inventory;

FIG. 12 illustrates design object relationships;

FIG. 13 illustrates ABBs identified to deliver services;

FIG. 14 illustrates an example of ABB lists and relationships;

FIG. 15 illustrates logical groupings of ABBs;

FIG. 16 illustrates tool selection based on design objects;

DETAILED DESCRIPTION

Figure 1:
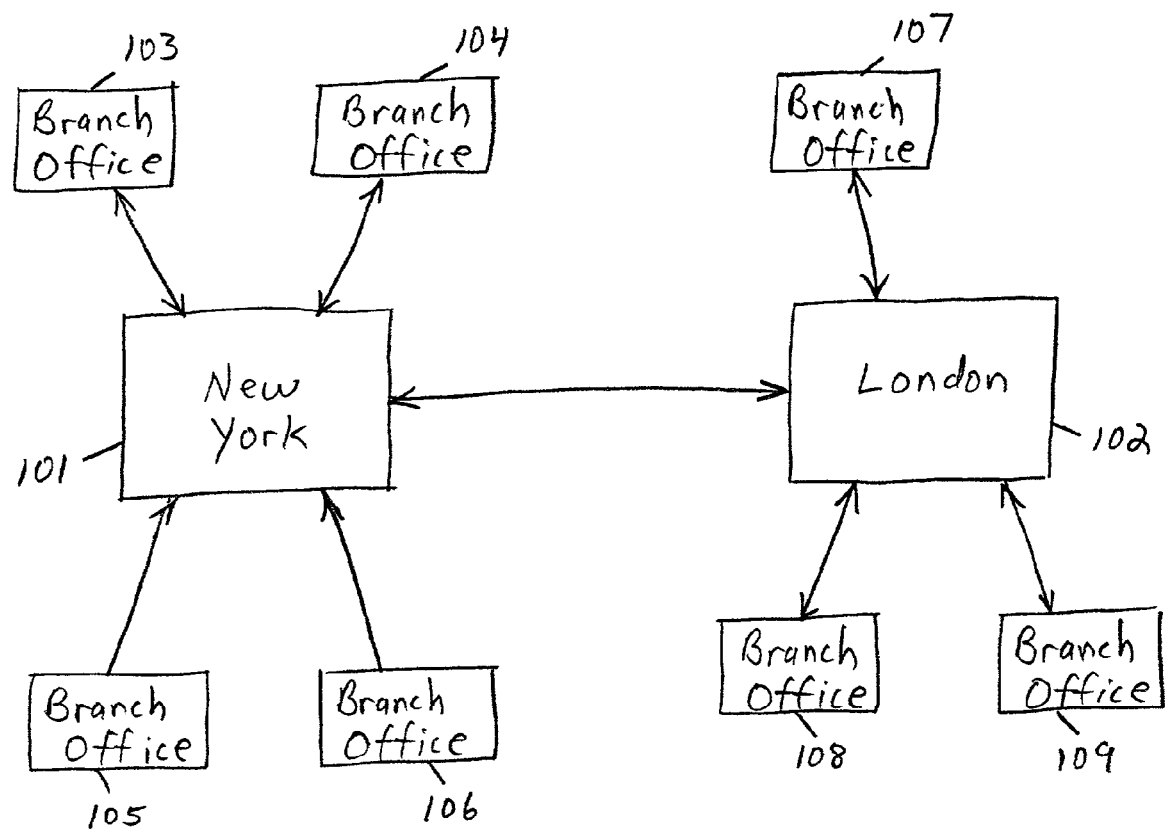
FIG. 1 illustrates an exemplary customer information technology infrastructure.

In the following description, numerous specific details are set forth such as specific IT configurations, etc. to provide a thorough understanding of the present invention. However, it will be obvious to those skilled in the art that the present invention may be practiced without such specific details. In other instances, well-known constructs have been shown in block diagram form in order not to obscure the present invention in unnecessary detail.

With the advent of e-business, which in most cases has to compete with traditional "non-e-businesses," the fundamental, underlying operations of many companies have changed. Although many of these companies very successfully had their act together when they were not e-businesses, they may not have mastered the exploitation of the underlying technology to the point they were at prior to adopting that technology. Because of the increasing complexity of the underlying technology and the total "interconnectedness" of that technology with core business processes, many of these companies have been faced with a particularly difficult problem—that of building and maintaining a workforce that includes people who can translate business into technology in order to keep their underlying business processes executing effectively within an e-business framework.

As these companies must also compete with "non-e-businesses," they have not only had to struggle to keep their underlying business operations effective, they have also had to focus on what "non-e-businesses" focus on, which is the customer experience. The successful companies have leveraged the skills of outsourcing and outtasking partners to maintain this dual focus on both maintaining the effectiveness of their business operations, as well as focusing on the new, electronic storefront. The successful e-businesses are rapidly turning "non-e-businesses" into "non-businesses."

Notice that in the last two or three paragraphs the word effective was used a few times, but the word efficient does not appear. This was by design, as there are many successful e-businesses that are effective, but that are not efficient. There is a fundamental reason for this. The traditional segmentation of "frontroom" and "backroom" functions is no longer possible when faced with new technology. More accurately, the "effectiveness bar" has been raised. Walls are falling. Sales can no longer be totally disjoint from finance, procurement can no longer merely throw product over the wall to sales. Companies must now take a more "holistic" or "end-to-end" view of their business. This overall, end-to-end view is how their customers see their business. Hence the focus on end-to-end management from a customer-centric view.

Perhaps holistic is not quite the correct word. The real definition of end-to-end or enterprise systems management is more circular than holistic. End-to-end management, enterprise systems management, merely means the management of what is important to the enterprise, between two well-defined end-points.

This does sound confusing, but it should not be. For a small business, the entire, end-to-end enterprise may be only a cash register and a backroom PC used to keep track of accounts payable and receivable. For a large multinational company, end-to-end may encompass all the supporting systems that make the purchase of a product through the Internet possible, including the front-end Web presence, the ordering and procurement system, the inventory system, the financial system, and potentially, connections or touch-points to systems outside of that company's control, such as EDI links, or real-time transaction connections to other companies. Beyond even those boundaries, an end-to-end enterprise could arguably include all business-to-business (B2B) and customer-to-business (C2B) systems and links.

As would be expected with something that could be as small as one machine or as large as the Internet, and potentially as complex as managing both the systems providing the customer experience and the business operations systems, there is not a "one-size-fits-all" solution for managing these disparate enterprises. Each overall, end-to-end enterprise systems management solution is, in fact, a unique solution.

This has challenged businesses, and particularly outsourcing and outtasking service providers, for quite some time. Businesses are built on the foundation of leveraging commonality of resources and knowledge to excel in service to customers. If each end-to-end systems management solution is unique, it is difficult for a service provider to continue to provide customers with the benefits of economies of scale and leveraged skills.

There are three terms in the following paragraphs: Framework, band of standardization, and standard methods. A framework is a fundamental and basic arrangement of subcomponents or parts. A framework typically identifies how those parts fit together at the highest level. Any large IT organization realizes that all systems management solutions that it deploys cannot be identical. Standards developed must allow customization, while maintaining the optimum identified level of standardization. That optimum level is known as the band of standardization. Another key is the development of standard methods. Even though a company may have a consistent, standard framework and clear definitions of the band of standardization, each group that deploys solutions within the framework must do so in a repeatable and consistent manner to maintain an advantage. That consistency is provided through standard methods for definition, deployment, and operation of the solution. For very large organizations, the major opportunity lies in a fourth term: leveraged knowledge. No individual department or delivery segment or organization can match the knowledge contained in all departments and delivery organizations combined. The difficulty, or trick, is to leverage that knowledge across the entire organization.

A framework adopted by the present invention for end-to-end Enterprise Systems Management is the Enterprise Systems Management Architecture (ESMA) Solution Framework. Here are a few definitions that will help in understanding the framework. The term enterprise in traditional use may identify any individual undertaking. The term enterprise may also identify a complete business. Within the context of the ESMA Solution Framework (and ESMA in general) an enterprise is comprised of those business undertakings defined as important to customers. Customers define what an enterprise is to them. This may be as small as a single server, or as large as an integrated manufacturing and distribution application. A system, within the context of ESMA, is a combination of software and hardware focused on providing a specific function. Management is the practice of administering, operating, and controlling. End-to-end within the context of systems management, has at least two similar and complementary meanings. From a transactional perspective, end-to-end means "from the beginning of the transaction through to completion of the transaction." From a systems perspective, end-to-end means "all-inclusive and all-encompassing." From an ESMA perspective, end-to-end means both of these things. End-to-end is viewing an entire enterprise system as a total entity, not separated by artificial delineations such as software or hardware platform. When an enterprise system is viewed based on the transactions that that system supports, end-to-end implies viewing that transaction from initiation through completion. To really adopt an end-to-end view, some context of either the enterprise ("what is important?", "what is the undertaking?") or the actual transaction ("how does it start?", "where does it end?") is applied.

From a general industry perspective, Enterprise Systems Management (ESM) is the ability to support key business processes by efficiently managing the underlying IT infrastructure from end to end, regardless of platform. ESM requires a complete set of processes, tools, and information that enables people to effectively manage all of their information technology resources, thereby providing the ability to support key business processes.

The term architecture is very much overused in the information technology industry. In terms of ESMA, adding the term architecture to Enterprise Systems Management implies that all those things which are focused on Enterprise Systems Management are architected, or are designed in an integrated, coordinated manner, with some overall "big picture" in mind.

In the context of ESMA, a solution is a combination of ESMA components (processes, tools, people, and information) focused on solving customers' systems management problems. For example, a solution may be focused on solving the problem of managing changes to a customer's IT environment. A framework is a fundamental and basic arrangement of subcomponents or parts. A framework typically identifies how those parts fit together at the highest level.

The ESMA Solution Framework is the fundamental and basic arrangement of all of the subcomponents or parts of each Enterprise Systems Management Solution.

The ESMA Solution Framework

There are many ways in which one could define the framework for delivering end-to-end Enterprise Systems Management Solutions. Although the ESMA Solution Framework is only one of those, the present invention adopts the same focus as e-business customers, focusing on both the customer experience (or the "relationship") and the "backroom operations" (the "infrastructure").

Relationship Management

In the context of ESMA, Relationship Management is the practice of administering, controlling, and operating the relationship between organizations using solutions defined within the ESMA Solution Framework and the customers of those organizations. Relationship Management is typically outwardly focused, or focused not on the actual management of systems, but focused more on the stated concerns of the customer and controlling external factors related to Systems Management, such as controlling change. A major element, or goal, of Relationship Management is maintaining and enhancing the effectiveness of overall Systems Management.

Infrastructure Management

In the context of ESMA, Infrastructure Management is the practice of administering, controlling, and operating the underlying customer infrastructure making up their enterprise. Infrastructure Management is primarily inwardly focused, or focused specifically on managing the underlying systems. Rather than focus on stated concerns of customers, in conjunction with Relationship Management, those stated concerns are translated into infrastructure-focused actions, or actions intended to ensure the ongoing "health" of the infrastructure. A major element, or goal, of Infrastructure Management is maintaining and enhancing the efficiency of overall Systems Management.

Service Management

In the context of ESMA, Service Management includes all activities associated with the administration, control, and operation of all customer-contracted services. This may include joint definition of strategies and standards with the customer. This definitely does include implementing Systems Management solutions focused on applying the disciplines of Systems Management. In short, Service Management is satisfying, or delighting, customers, including Relationship Management and Infrastructure Management.

Disciplines

A discipline is the logical grouping of ESMA components (Process, Tools, People, and Information) that address distinct planning, control, and operational objectives. When solutions defined as part of a particular discipline are implemented, they satisfy a functional objective of Enterprise Systems Management.

Disciplines defined within the ESMA Solution Framework include:

Data, Storage, and Output Management

Administration

Event Management, Alerting, Paging, and Escalation

Security Management
Operations Management and Automation
Capacity and Performance Management
Business Process and Application Management
Request Management
Decision Support
Knowledge Management
Asset Management
Call Management
Problem Management
Change Management Data, Storage, and Output Management This discipline is focused on the management of all data, including everything from complex relational databases on the high end of the scale down to tapes and disks on the low end of the scale. This discipline also includes the management of the underlying storage systems, back-up of data, and output of data through approaches such as the management of print operations.

Administration

This discipline is focused on the underlying administration of the delivery of Enterprise Systems Management solutions provided to our customers. Administrative functions such as planning, managing processes, deployment testing, controlling continuity (or disaster recovery), handling skill requirements, and controlling service levels are covered by this discipline.

Event Management, Alerting, Paging, and Escalation

An event is an indication of a change of state within a monitored system that may or may not be relevant to the overall management of a customer's Enterprise System. This discipline is focused on the capture of events, determination of relevance of events (filtering and correlation), initiation of action (either through automation or through alerting or paging), automated monitoring and reporting of progress toward final disposition of events (escalation), and final disposition of the events.

Security Management

This discipline is focused on all aspects of Systems Management Security, from user ID administration through overall physical and logical security. This discipline includes planning for security and monitoring security, as well as such specific techniques as intrusion detection and ethical hacking.

Operations Management and Automation

This discipline is focused on exploiting automation to build, maintain, manage, and run customer operating environments. This discipline includes automated job scheduling and monitoring, both within a single operating environment and across operating environments. It also includes distribution and implementation of the operating environment. Because an end-user's desktop is that end-user's operating environment, this discipline includes the use of such tools and techniques as desktop software distribution and desktop remote takeover.

Capacity and Performance Management

This discipline is focused on measuring, reporting, and managing the overall performance of a system. This performance may be at the component level, across a subset of all components, or across all the components that make up the customer's enterprise. The primary difference between Capacity Management and Performance Management is that Capacity Management is primarily focused on acquiring or retiring components (building the environment), while Performance Management is focused on monitoring, managing, and tuning the components that are in place.

Business Process and Application Management

This discipline is focused on managing the systems supporting the customer's defined enterprise from a business perspective, based on the overall business process being enabled by those systems.

Another term used to describe this concept is Business Systems Management.

This is significantly different than managing systems based on the traditional, technology-biased views (based on technology or software platform). Application Management is a subset of this discipline where systems are managed based on the application (rather than Business Process) that they support. A Business Process is typically made up of many applications. This discipline includes what is traditionally known as Availability Management, from the availability of components to the availability of entire applications, through the availability of entire Business Processes.

Within the ESMA context, Business Process and Application Management does not include the actual performance of the Business Process (for example, running a procurement business for a customer) nor Application Management in the sense of application development and support. This discipline is focused on the Systems Management of the underlying enterprise components as defined by a customer.

Request Management

This discipline is focused on receiving and managing customer requests for service. This may be as small as accepting the actual request and tracking fulfillment of that request. This may be as large as actually executing steps to fulfill the request that fall either inside or outside of the other discipline areas.

Decision Support

This discipline is focused on using available, electronically stored information to enable end users to make better, more informed decisions. This discipline includes techniques and algorithms as simple as decision trees and drop-down lists. This discipline also includes complex techniques, such as data mining and the application of artificial intelligence.

Knowledge Management

This discipline is focused on the logical use of stored knowledge. Data is typically gathered from multiple sources and stored as data. By correlating that data with other data and applying some context (such as source and location), that data becomes information. Knowledge is information that has been "filtered" by experience, or when delivered electronically, information that is entirely pertinent to the situation at the moment when the knowledge is delivered. Put another way, knowledge is acquired almost passively (you "know" something), whereas information is acquired actively (you are "looking" for information). Through complex artificial intelligence algorithms, electronically delivered knowledge will greatly reduce the requirement to actively "look" for information, providing knowledge at the moment that it is required.

Asset Management

This discipline is focused on the tracking of the full life cycle of a piece of hardware or software from the time of capital planning, through procurement, and final disposition or disposal of that asset. This discipline includes subcomponents such as asset inventory (including wall-to-wall inventory methods), asset tracking, financial asset management (including financial to physical reconciliation), and software license management. This discipline also includes tracking and reporting of the logical and physical configuration of assets (what "makes up" an asset).

Call Management

This discipline is focused on the receipt and handling of calls from customers. A call from a customer may be related to any other discipline and may take the form of an actual telephone call, an e-mail, a fax, and so forth.

Problem Management

This discipline is focused on tracking, analyzing, and correcting incidents or problems. This discipline includes the short-term correction (through workaround) of problems, coordination of multiple corrective actions, and broader scope approaches, such as "critical situation management." This discipline also includes short-term analysis (such as problem determination) and long-term analysis (such as root cause analysis) of problems.

Change Management

This discipline is focused on scheduling and tracking changes. This discipline includes such small changes as desktop changes (known as Install/Move/Add/Change, or IMAC) and changes as broad as major enterprise-wide changes.

Management Towers are logical groupings of the subcomponents of a customer's enterprise, which roughly equate to the way that many delivery organizations are organized to support information technology. This is primarily based on the physical architecture of the underlying technical platforms. Management Towers are often also called Islands of Management because management within each tower is typically done in a stand-alone manner, disjointed from the other islands. Management across these towers in a consistent, efficient, and effective way is the fundamental goal of ESMA. The ESDTA has been designed to satisfy that fundamental goal.

Figure 3:
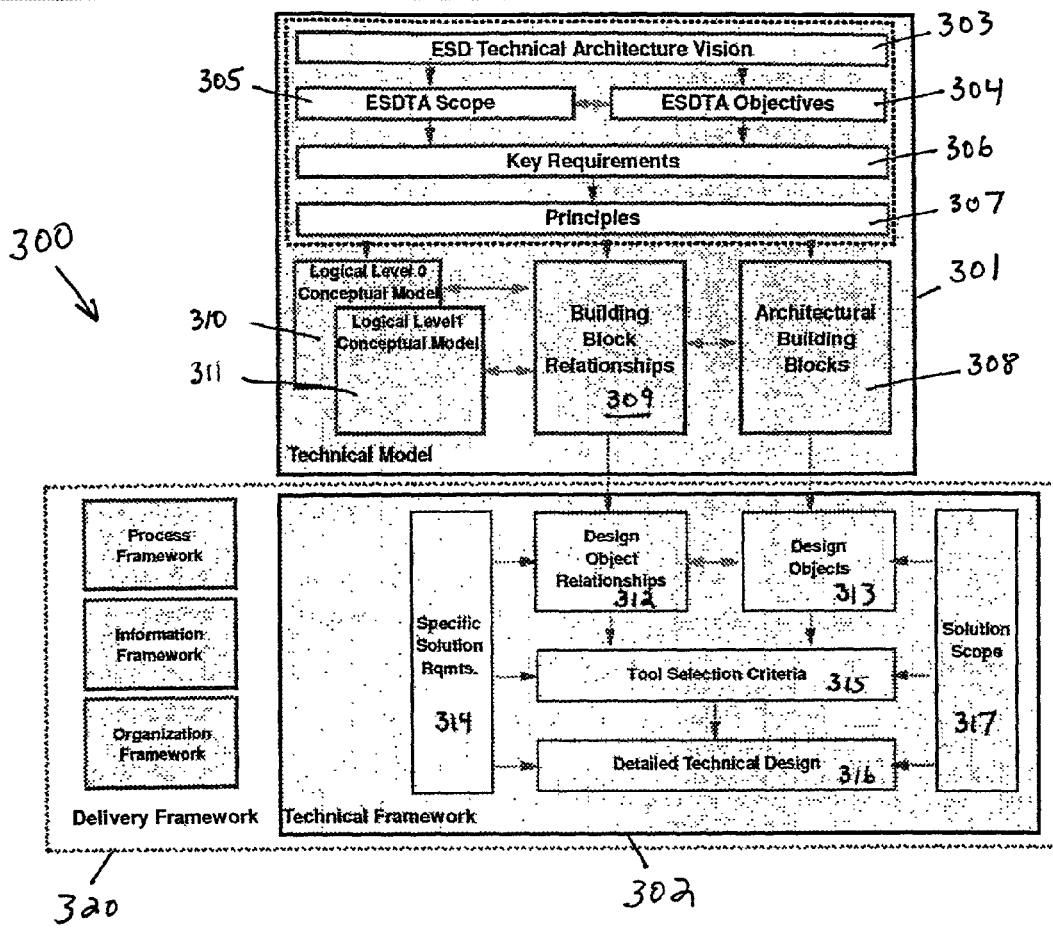
FIG. 3 illustrates an ESD Technical Architecture configured in accordance with an embodiment of the present invention.

Referring to FIG. 3, the ESDTA 300 contains two major components, the ESD Technical Model 301 and the ESD Technical Delivery Framework 302. The ESDTA 300 describes the structure of the complete set of technical components (models, frameworks, definitions, architectural building blocks, etc.) that an information technology outsourcer requires to deliver services. The ESDTA Vision 303 is to enable the rigorous and consistent management of information technology services provided in a seamless manner across all platforms, leveraging resources and delivering business value while driving toward computing as a utility. The ESDTA Scope 305 is the architectural foundation supporting service design. The ESDTA 300 does not represent any part of the engagement or contract process but provides guidance for the conversion of the customer's tool set into the agreed standard. ESDTA Objectives 304 are to provide an open framework for IT Resource Management that promotes customer business objectives, minimizes the impact of implementation and transition on both the customer and the service delivery provider, facilitates standard service delivery globally and facilitates leveraging resources across traditional boundaries (technical, organizational, process, and informational). A strategy with the ESDTA Objectives 304 is to use consistent interfaces to facilitate a plug-in functionality, and to adhere to appropriate industry standards.

Key Requirements 306 are that the ESDTA must enable delivery of service for multiple customer environments from a central point-of-control, for a single customer environment for multiple points-of-control in using point-of-control combinations. But within the architecture, each point-of-control solution may be viewed as the single means of supporting a given customer. Actual delivery of service may require combinations of points-of-control due to contractual, geographical, linguistic, and/or chronological requirements. Portions of the solution for a customer may be managed out of one delivery center while other portions of the solution may be managed from other delivery centers requiring fragmentation of the point of control to achieve the business objectives of the customer.

Principles 307 are underlying, general rules that are durable and have wide applicability across the architecture, such as that the architecture will enable a standard end-to-end scalable, integrated solution applicable to all customers. Principles 307 must map to the Requirements 306, stand the test of time, and be seen to be true for all solutions; as such they must stand up to any challenge. As the architecture evolves, Principles 307 must always hold true and cannot be compromised. All elements of the architecture inherent Principles 307. A first principle is motivation, which includes reducing the architecture complexity and infrastructure costs while supporting continuous improvement by remaining flexible enough to use new technologies, reducing training and staffing costs, reducing system integration costs, and allowing the outsourcing entity to provide service to any customer set, regardless of size, geography or language, the nature of the business, or technology or scope of the management services required. Another principle is integration which implies that the organization may need to be changed to cater for integrated delivery. Transition of current solutions may require additional investment to converge on the architecture, and there is a need for buy-in and commitment by management of the customer.

Use of the ESD Technical Model 301 as the base for defining and documenting all capabilities required to deliver ESM services solves the problem of not designing those solutions from an overall business process perspective, encompassing management of all components required to support those business processes regardless of technology platform. The ESD Technical Model 301 was developed through extending the concepts contained within the IBM consulting information technology architecture method to satisfy the unique requirements of ESM. From reviewing IBM intellectual capital related to the information technology architecture method, the application and extensions of the present invention are innovative and original, utilizing the "breakdown" structure described by that method in a way not done before to describe the capabilities or functions required to deliver ESM solutions. Within the ESD Technical Model 301, each of the critical technical capabilities required to create ESM solutions is defined as an Architectural Building Block ("ABB") 308. ABBs are components of the architecture that are sufficiently modular and bounded to be described as self-contained entities. ABBs are used to construct logical views of the Technical Architecture. Each ABB is independent of the underlying physical implementation and does not imply, or exclude, a specific physical architecture. Each ABB is defined to encapsulate a function and to document its relationships to other ABBs. Criteria for tool selection are derived from the ABB and its relationships. Each high-level ABB 308 has been decomposed into lower level ABBs which individually identify all capabilities or functions required to provide ESM solutions. These ABBs 308 have been decomposed to the lowest level of uniqueness of function. The following are exemplary ABBs. The User Interactive Services ABB describes technology that renders information into the format needed for views. Views encompass the rendering of information in a way that the recipient of the information can use, based on the requirements of his or her role. The Access Services ABB describes the technology that provides common, standard, and open means for providing paths to data and IT resources in a secure, controlled way. It includes directory and navigation services to enable other functions to access data consistently. The Integration ABB describes the requirements placed on technology to support the integration, via data translation, necessary for the use of information within and across management capabilities. The Data ABB describes the data characteristics and the technology used to manage that data. This is both management- and customer-related data. The Management Enablement ABB describes the requirements placed on technology to enable the management functions defined with the process architecture. By meeting these requirements, global IT resources can be supported by common, standard, and open means and managed from a business process perspective. The global IT resources ABB describes the entire collection of endpoint devices, computing platforms, data, and infrastructure components identified by the customer for global services to manage, as well as all endpoint devices, computing platforms, data, and infrastructure components used to support a business entity's IT services.

Figure 4:
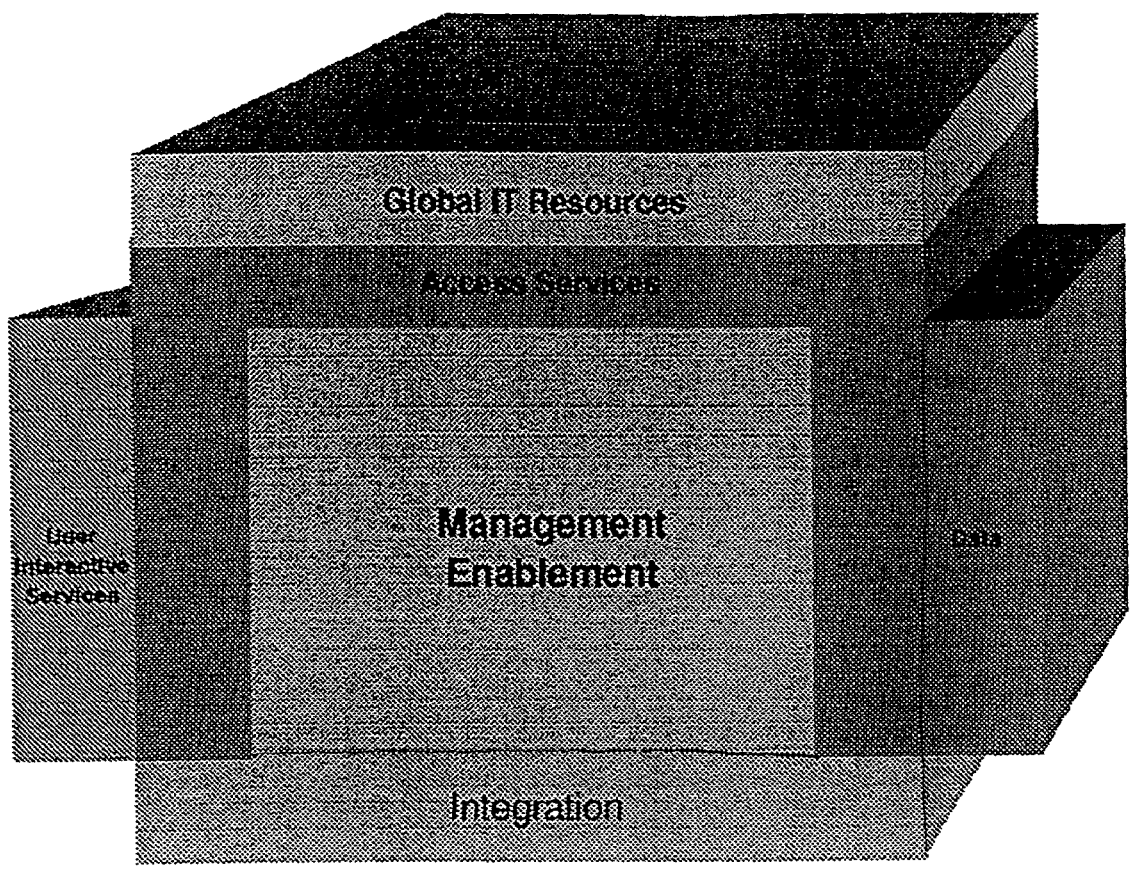
FIG. 4 illustrates an ESD Technical Architecture logical level conceptual model.

There are four levels of ABBs 308 within the Technical Model 301. The highest level of abstraction is the conceptual level or level 0. All the major components described within level 0, and the relationships between them, are depicted in the logical level 0 conceptual model illustrated in FIG. 4. FIG. 4 depicts the Technical Architecture 300 that supports the IT services provided. The architecture was designed to provide enterprise-wide, end-to-end services, not only from the technology perspective, but with the business perspective in mind. A major benefit of the architecture is that it positions IT services to transition computing functions from today's "technocentric" paradigm to a "utility" paradigm. It also offers an effective way to adopt the tenets of "zero-latency" for IT services. The global adoption of the architecture will support the seamless delivery of services across multiple geographies. The present invention uses an organized and consistent set of policies, standards, protocols, and published interfaces to select technical components that support the Enterprise Systems Management processes. These technologies enable systems management by means of the following capabilities. The user interface is the technology that renders information to and from the user into the format needed for views and for the applications. Views encompass the rendering of information in the way that the recipient can use, based on the requirements of his or her role. Access is the technology that provides common, standard, and open means for providing paths to data and IT resources in a secure, controlled way. Integration is the requirements placed on the Technical Architecture 300 to support data and application integration necessary for the interaction across functional entities. Data is the technology that supports the actions performed against the Enterprise Data Repository (EDR). The EDR contains the information required for the delivery of ESMA services. The logical structure and contents of the EDR are described by the ESMA Information Architecture. Management enablement are the requirements placed on technology to enable the application components defined within the process architecture so that global IT resources can be supported in a common, standard, and open means and managed from a business process perspective. Global IT resources are the objects being managed.

Figure 5:
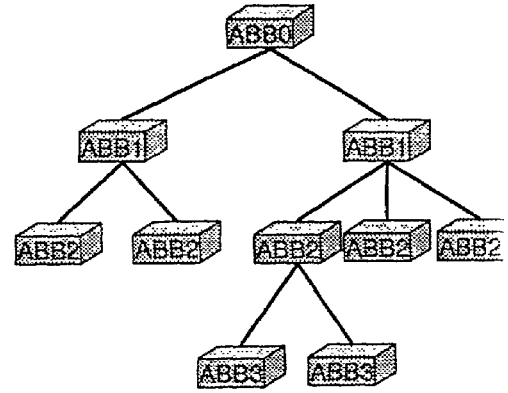
FIG. 5 illustrates an exemplary architectural building block decomposition.
Figure 7:
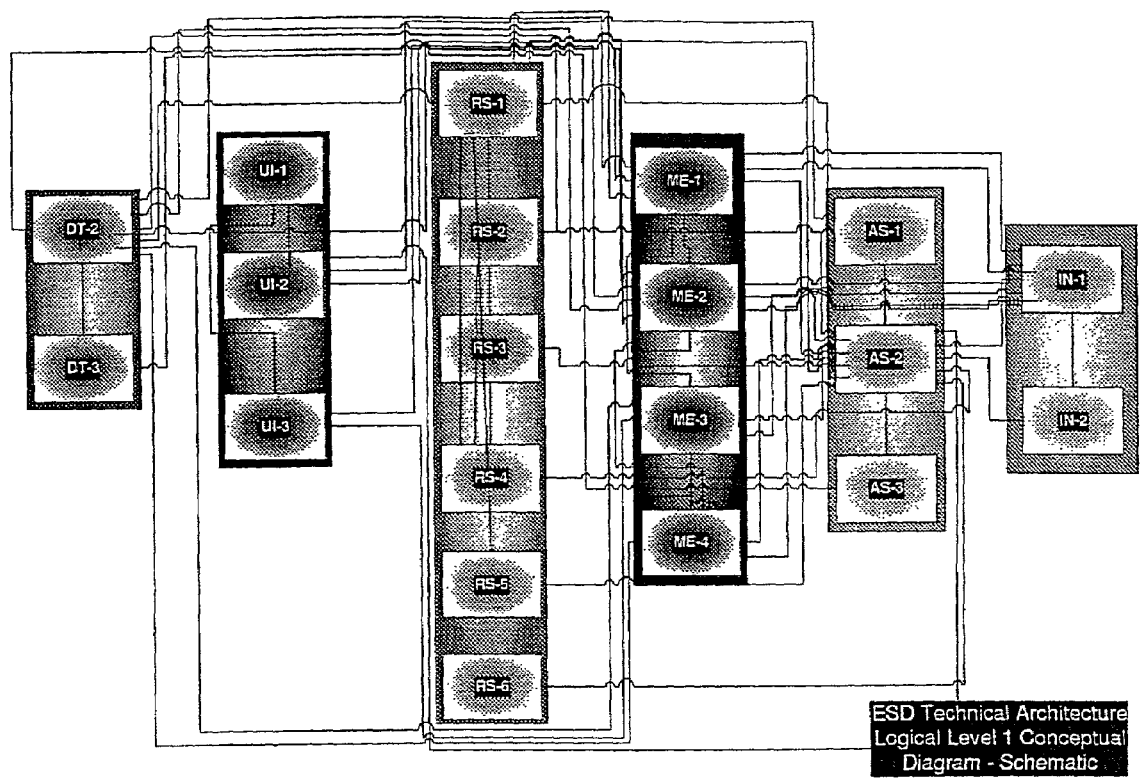
FIG. 7 illustrates an exemplary level 1 ABB relationships schematic representation.

To illustrate decomposition of the ABBs 308 depicted in the logical level 0 conceptual model diagram of FIG. 4, FIG. 5 illustrates a sample decomposition tree for one of the level 0 ABBs. Each ABB 308 is fully documented including a description, with what the ABB includes, what it excludes, etc. One key element of documentation is the relationship that each of the ABBs has to the other ABBs. This information is critical to designing complete ESM solutions utilizing the ESD technical deliver framework design method. These relationships have not only been captured within the conceptual diagram in FIG. 4 and within the documentation of ABBs, but also utilizing the following exemplary table illustrated in FIG. 6. And for level 1 ABBs, in the schematic diagram illustrated in FIG. 7.

The entire ESD Technical Model 301 has been developed to align with the ESD Technical Architecture Vision 303, Scope 305, Objectives 304, and Principles 307, and to satisfy the ESD technical architecture identified Key Requirements 306.

Utilizing the ESD Technical Delivery Framework design methodology of the present invention, the Technical Delivery Framework 302 is created to reflect the individual requirements of each customer, while maintaining a direct relationship to the ESD Technical Model 301. The entity providing outsourcing services, e.g., IBM, will maintain a template ESD Technical Delivery Framework 302 which can then be modified to reflect individual account or delivery center requirements. Each of these Technical Delivery Frameworks 302 will maintain the identified relationships with the Technical Model 301. By maintaining the relationships to the Technical Model 301, the overall integration between customers will be insured. The key to insuring that this mapping is maintained is the correct and complete identification of Design Objects 313. Design Objects 313 are the basic foundation for all tool selection and design within each Technical Framework 302. Design Objects 313 will be defined based on the Specific Solution Scope 317 for each technical delivery and may be unique for each Technical Delivery Framework 302. An individual Design Object 313 is a collection of "qualified" lowest level ABBs 308 with "attributes" added based on the specific solution being developed. For example, if an ABB 308 entitled "Check Status" were selected for inclusion in a Design Object 313, it would be "qualified" with a scope of what status is being checked (e.g., are all servers "up," did a job complete, etc.).

ABBs 308 are selected for inclusion in a Design Object 313 based on commonality of either platform (where the actual ABB's associated systems management capability would execute) or function (a change management design object). Design Objects 313 might be defined that mapped one function to one tool (e.g., a Design Object 313 describing the complete set of capabilities regarding problem management would map to one, complete problem management tool). With current technology, there is a requirement to satisfy all the functional requirements identified within a Design Object 313 with integration or linkage processes.

Figure 8:
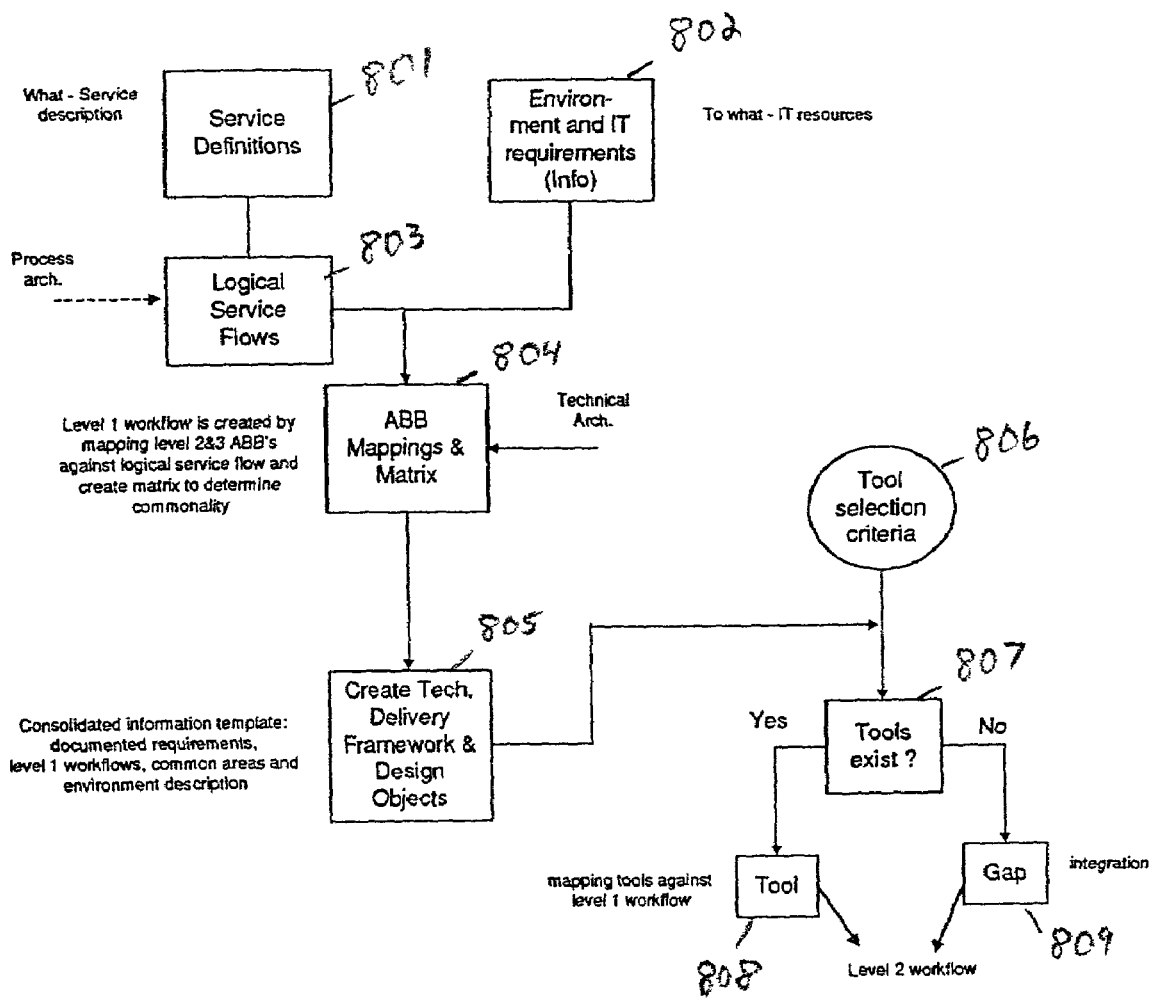
FIG. 8 illustrates a method in accordance with an embodiment of the present invention.

The Relationships 312 between Design Objects, as well as the Design Objects 313, lead to a revision of a set of template Tool Selection Criteria 315 which have been developed to reflect the customers actual requirements. By applying the Tool Selection Criteria 315 to Specific Solution Requirements 314, within the Specific Solution Scope 317, tools are selected that are totally integrated or integratable within each Technical Framework 302, and "top to bottom" within the ESD Technical Architecture 300. A methodology in accordance with the present invention is illustrated in FIG. 8. Each activity within this flow diagram is illustrated using a "swim lane" based process mapping technique referred to as the line of visibility engineering method (LOVEM). An object of the design methodology process in accordance with this embodiment of the present invention is defined in means by which technical service requirements can be mapped against components of the Enterprise Service Delivery Technical Model 301 to design a solution that is effective, efficient, and integrated with other ESM solutions previously provided by the outsourcing service provider (Blocks 801 and 802). The activities required to deliver specific services are used to select and "qualify" each ABB 308 required to deliver that service (Block 803). ABBs 308 are qualified by adding "attributes" that indicate how and/or against what component that the capability is being applied (Block 804). These ABBs 308 are then grouped, based on commonality (of platform or function) to identify Design Objects 313 (Block 805). Defining design objects 313 in this way is a unique approach to designing ESM solutions. Tools (software) are then selected (Block 806) to satisfy the requirements in relationships identified within and between these design objects 313. Gaps (Block 809) between requirements for tools and actual tools are identified (Blocks 807, 808) to be filled with either skills, processes or integration. This approach is loosely based on the IBM Consulting Systems Management Framework Design (SMFD) methodology, with significant extensions focused on utilizing the specific Technical Model 301 in accordance with the present invention. The methodology of the present invention takes the design of the Technical Delivery Framework 302 to a much lower level and never attempted using SMFD, and is fundamentally a different application of some SMFD concepts. Within the SMFD methodology there is no concept of ABBs 308 or Design Objects 313. Once tools have been selected, and augmented by process changes, skills acquisition or integration, satisfying all the relationships and requirements captured within the definitions of the Design Objects 313, standard low-level design techniques are utilized to determine placement and configuration of these tools within the target environment. The target environment is analyzed and documented. The geographic location, size and capacity, etc. of each physical technical resource which is to be managed with the ESM solution creates additional requirements on the actual physical design of the ESM solution. The end result of utilizing the methodology of the present invention within the overall ESD Technical Architecture 300 is the creation of ESM solutions which are consistent in their delivery of services across all target environments, regardless of platform, using documented processes integrated with the selected tool set, both within individual customers, and across customers.

For a better understanding of the present invention, the following example is instructive. The Enterprise Service Delivery (ESD) Technical Architecture 300 describes the overall structure including how the ESD Technical Model 301 and the ESD Technical Framework 302 relate to each other. The ESD Technical Model 301 is fairly static, and describes all of the components (people, process, tools and information) that are used to deliver specific services to customers, as well as describing (in generic terms) the components of all customer environments.

A ESD Technical Framework 302 describes the actual systems management solution, or framework, that is used to deliver a set of specific services to a customer.

The ESD Technical Delivery Framework Design Methodology describes how to use the relationships defined in the ESD Technical Architecture 300, and specifically the ESD Technical Model 301, to develop a specific Delivery Framework 320 (based on the ESD Technical Framework 302) for delivery of a specific set of services for a customer.

Referring to FIG. 1, in order to describe, in "real world" terms, embodiments of the invention, examine an exemplary customer technical environment. "Big World Bank" (BWB) is a company that has offices in Europe and North America. The main data center 101 for BWB is located in New York. The New York data center 101 contains a large mainframe server, and several smaller servers. There are many branch offices 103-106 throughout the U.S. The European headquarters 102 for BWB is in London. At this site, there are several servers which provide computing power to many offices 107-109 spread through the U.K.

Figure 2:
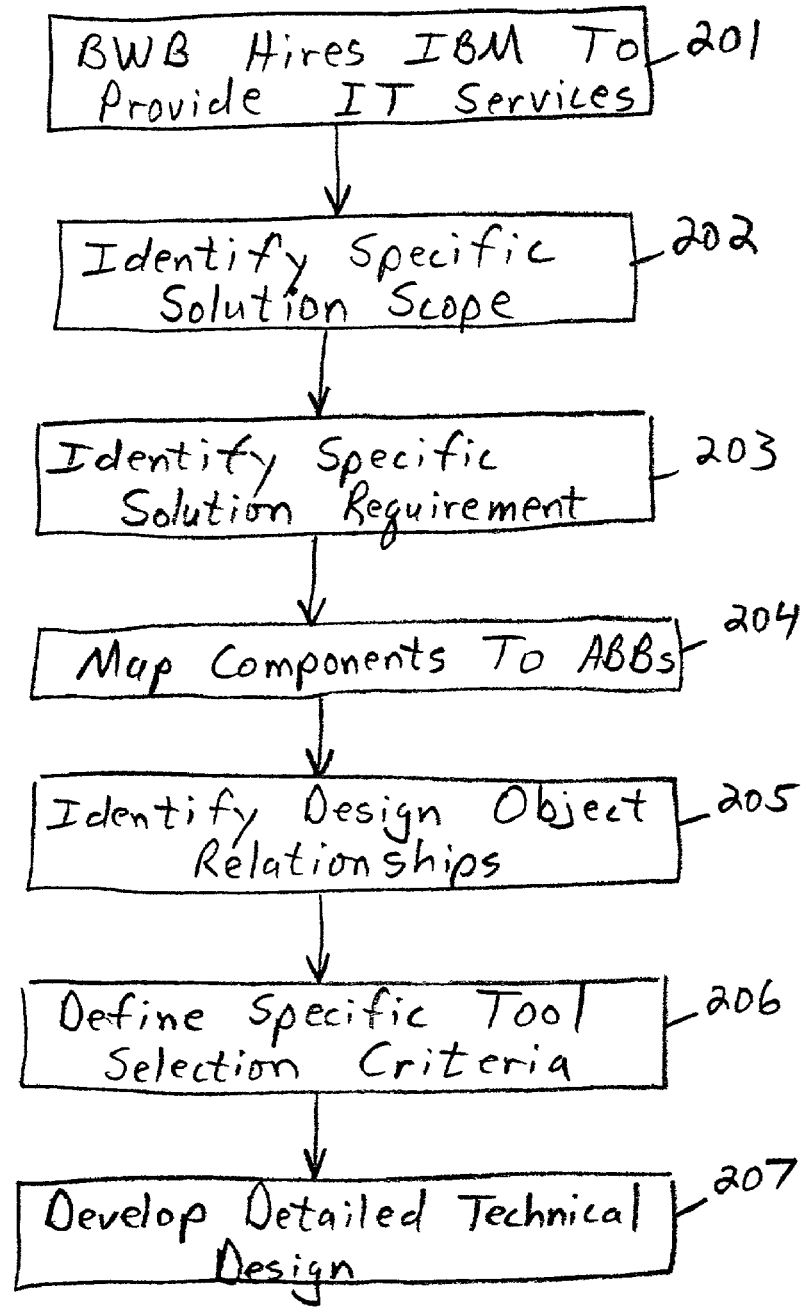
FIG. 2 illustrates a flow diagram configured in accordance with an embodiment of the present invention.

Also referring to FIG. 2, BWB has decided that they wish to no longer completely support their Information Technology (IT) environment with their own people, and have turned to an outsource service provider (e.g., IBM) to request that IBM (step 201) begin to provide two specific services for their environment: Problem Management (identifying and solving problems with the environment, discovering root cause, recommending changes, etc.) and Event Management (tied to Problem Management, but focused on immediate response, both automated and manual, to electronic events that are detected in the environment—e.g. a server goes down, creating an electronic event indicating that it can no longer be "seen" on the network.) In order to provide these services, IBM must build a Delivery Framework 320 describing what people, processes and tools (and identifying information requirements) that will be deployed to provide the desired functionality.

The ESD Technical Delivery Framework Design Methodology (TDF-DM) is focused on identifing the specific tools, or technology, which will be deployed to provide services for customers. When BWB approached IBM, IBM began to build documents and deliverables identified in the ESD Technical Delivery Framework (TDF) based on the approach described by the TDF-DM. The TDF is one of four (4) frameworks that were required to provide service to BWB.

The next step (step 202) was to identify the specific Solution Scope 317 as described in the contract, and based on common practices for delivering certain types of services. For Problem Management and Event Management, this would entail identifying hours of service, and which components (in general terms, such as "all NT servers") which are in scope, etc. The next step (step 203) was to identify the Specific Solution Requirements 314 for this solution. IBM went out to the customer site and inventoried every piece of equipment that was in the scope of the contract, including servers, workstations, network routers, hubs, etc. FIG. 9 illustrates an example of such inventory for BWB "in scope" hardware.

At this point, each component was mapped (step 204) to the lowest level Architectural Building Block (ABB) 308 described in the ESD Technical Model (ESDTM) 301. FIG. 10 illustrates an example of the lowest level ABBs 308 available in the ESD Technical Model 301. FIG. 11 illustrates an example of the mapping of each component in the BWB inventory (FIG. 9) to the ABBs (FIG. 10). For example, there perhaps was a building block identified as "Workstation". Each workstation would be identified as being an instance of that ABB 308. In addition to being an instance of ABBs 308, each inventoried component would also have certain attributes which would also be captured. Again using the workstation example, in the ABB definition for a "Workstation", it would be indicated that each workstation has attributes such as an Operating System, a CPU, a Disk Drive, a Network Card, etc. Each of these attributes would be captured.

As well as categorizing each component in the customer environment and assigning/identifying attributes, the relationships (Design Object Relationships 312) between these components would be identified (step 205). For example, a workstation is connected to a hub, which is one type of relationship. Another relationship would be what application a workstation is implemented to support for a customer. FIG. 12 illustrates an example of such identified Design Object Relationship 312 for the BWB contract.

Once the entire customer environment in terms of ABBs have been described, then the systems management ABBs in the ESDTM are looked at that were required to provide the specific Problem and Event Management services. For example, it was known that a component described by an ABB would be needed that would provide the capability to store and forward events. FIG. 13 illustrates an identification of which ABBs 308 from the Technical Model 301 were needed to deliver the "in scope" services of BWB. FIG. 14 illustrates examples of ABB Lists and Relationships indicated in FIG. 13.

When all of the ABBs were identified that were needed to provide Problem and Event services, then all of the ABBs were mapped describing the BWB environment, and all the systems management ABBs in the model together, based on the relationships of the customer ABBs and the relationships contained in the model. At this point, there was a consistent model for the entire systems management solution for Problem and Event Management for BWB, that was also consistent with the overall model (ESDTM) for delivering service. This complete model was made up of Design Objects 313 based on logical groupings of ABBs 308. FIG. 15 illustrates identified Design Objects 313 for the "in scope" services based on logical groupings of ABBs 308 for the BWB example.

The consistency of the Technical Model 301 was ensured through maintaining the groupings of the ABBs 308 identified in the Logical Level 0 310 and 1 311 Models. Those models 310, 311, the relationships 309 and the ABBs 308 were all designed based on a common set of Principles 307, identified to satisfy Key Requirements 306, derived from the ESD Technical Architecture Scope 305 and Objectives 304, which all were developed to drive toward the ESD Technical Architecture Vision 303.

With the complete set of Design Objects 313 identified for BWB, specific Tool Selection Criteria 315 were defined (step 206). For example, from the Technical Model 301, it was known that all the systems management tools selected had to be capable of working on all of the platforms (servers, workstations, etc.) that were in the customer environment. From the attributes identified in the Design Objects 313, it was known what that list of platforms was, so criteria were identified that stated that the "tool for storing and forwarding events must execute on Windows 95, Window NT, and AIX Operating systems, etc."

Figure 17:
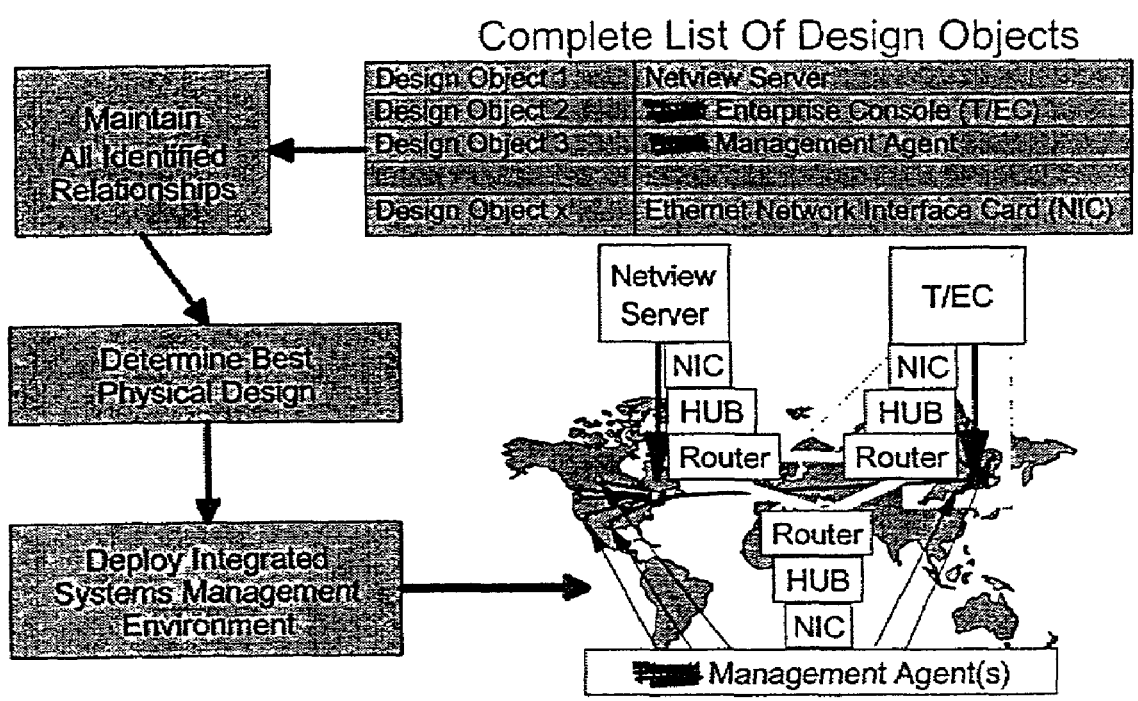
FIG. 17 illustrates an exemplary detailed technical design with design objects.

With the defined Tool Selection Criteria 315, all the specific tools (including hardware and software) were selected, and based on the Specific Solution Requirements 314, and Solution Scope 317, in step 207, a Detailed Technical Design 316 for the systems management environment was developed. FIG. 16 illustrates an example of such Tool Selection. In this example, a design object has been identified that includes a mainframe, a data store, a hub and a management server. For each of these parts of the design object, it is known how they relate, or are combined to provide functionality. Based on the servers needed to be provided (in this example, problem management and event management) it is known what relationships between these components are required. These requirements are used to evaluate available tools to select tools that satisfy all the relational requirements contained in the design object. FIG. 17 illustrates an example of a detailed Technical Design with Design Objects for the BWB example. When it is known that all of the requirements have been satisfied dictated by the relationships described in the design objects by selecting all the appropriate tools (software and hardware), a consistent, low level design can be created of the ESM solution. By maintaining all relationships, integration is ensured into the overall systems management environment. This example illustrates components (such as Netview Server, Tivoli Enterprise Console, hubs, routers, etc.) that would be selected and deployed based on the method.

By using this method, a specific Technical Framework 302 was designed for BWB that satisfied all of their requirements for Problem and Event Management. Though the maintenance of relationships described in the model, the systems management solution for BWB provided the capability to deliver services in the most efficient and effective way, and facilitated delivering those services using common, standard technology, practices, etc., across all customer platforms (i.e. server, workstation, mainframe, network component, etc.)

In addition, should the scope of the support requirement/contract change, the ESDTM and the TDF define the model and the framework into which the components of the new service can be fitted, in such a way as to ensure that the entire new solution is part of one comprehensive service offering. The methodology describes how the enhanced service can be rolled out in a way which is effective, efficient and consistent across all of the service delivery organization.

Figure 18:
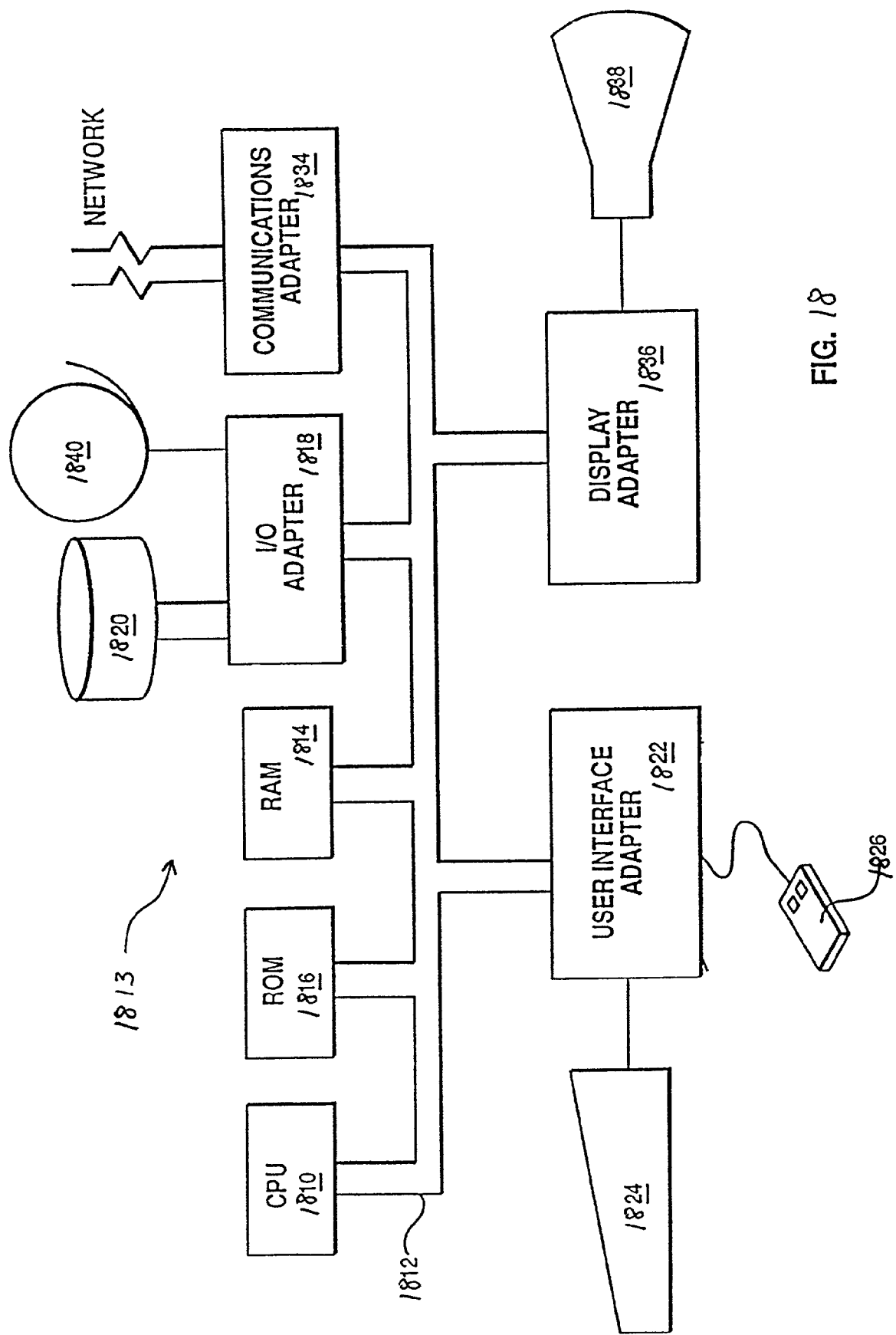
FIG. 18 illustrates a data processing system configured in accordance with the present invention.

Referring first to FIG. 18, an example is shown of a data processing system 1800 which may be used for the invention. The system has a central processing unit (CPU) 1810, which is coupled to various other components by system bus 1812. Read only memory ("ROM") 1816 is coupled to the system bus 1812 and includes a basic input/output system ("BIOS") that controls certain basic functions of the data processing system 1800. Random access memory ("RAM") 1814, I/O adapter 1818, and communications adapter 1834 are also coupled to the system bus 1812. I/O adapter 1818 may be a small computer system interface ("SCSI") adapter that communicates with a disk storage device 1820. Communications adapter 1834 interconnects bus 1812 with an outside network enabling the data processing system to communicate with other such systems. Input/Output devices are also connected to system bus 1812 via user interface adapter 1822 and display adapter 1836. Keyboard 1824, track ball 1832, mouse 1826 and speaker 1828 are all interconnected to bus 1812 via user interface adapter 1822. Display monitor 1838 is connected to system bus 1812 by display adapter 1836. In this manner, a user is capable of inputting to the system throughout the keyboard 1824, trackball 1832 or mouse 1826 and receiving output from the system via speaker 1828 and display 1838.

Implementations of the invention include implementations as a computer system programmed to execute the method or methods described herein, and as a computer program product. According to the computer system implementation, sets of instructions for executing the method or methods may be resident in the random access memory 1814 of one or more computer systems configured generally as described above. Until required by the computer system, the set of instructions may be stored as a computer program product in another computer memory, for example, in disk drive 1820 (which may include a removable memory such as an optical disk or floppy disk for eventual use in the disk drive 1820). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for using an enterprise service delivery technical model to develop a technical framework to provide Systems Management services to a customer, comprising the steps of:

identifying a Systems Management solution scope specific to an information technology environment of the customer;

inventorying existing information technology and Systems Management components supporting the information technology environment of the customer that are within the Systems Management solution scope;

mapping the existing information technology and Systems Management components supporting the information technology environment of the customer to architectural building blocks of a predetermined enterprise service delivery technical model;

identifying which architectural building blocks of the predetermined enterprise service delivery technical model are required to deliver the Systems Management services to the customer in accordance with the Systems Management solution scope; and mapping the inventoried existing information technology components that were mapped to the architectural building blocks of the predetermined enterprise service delivery technical model to the architectural building blocks of the predetermined enterprise service delivery technical model that were identified as required to deliver the Systems Management services in accordance with the Systems Management solution scope, this mapping step resulting in a list of design objects and relationships between the design objects that will deliver the Systems Management services in accordance with the Systems Management solution scope.

2. The method as recited in claim 1, wherein the architectural building blocks and defined relationships between the architectural building blocks are a function of a set of predefined principles and key requirements.

3. The method as recited in claim 1, wherein relationships between the architectural building blocks are arranged in predefined logical levels.

\* \* \* \* \*